(12) United States Patent
Aguilar et al.

(10) Patent No.: US 10,288,080 B2
(45) Date of Patent: May 14, 2019

(54) PUMP SEAL LUBRICATOR

(71) Applicant: The Modern Group, Ltd., Beaumont, TX (US)

(72) Inventors: John David Aguilar, Conroe, TX (US); Tommy Dale Inman, Kingwood, TX (US)

(73) Assignee: The Modern Group, Ltd., Beaumont, TX (US)

( * ) Notice: Subject to any disclaimer, the term of this patent is extended or adjusted under 35 U.S.C. 154(b) by 519 days.

(21) Appl. No.: 14/983,164

(22) Filed: Dec. 29, 2015

(65) Prior Publication Data

US 2017/0184114 A1    Jun. 29, 2017

(51) Int. Cl.

| F04D 29/10 | (2006.01) |
|---|---|
| F04D 29/06 | (2006.01) |
| F16J 15/18 | (2006.01) |
| F04D 29/42 | (2006.01) |
| F04D 13/12 | (2006.01) |
| F04D 25/16 | (2006.01) |

(52) U.S. Cl.
CPC .............. F04D 29/06 (2013.01); F04D 13/12 (2013.01); F04D 25/16 (2013.01); F04D 29/10 (2013.01); F04D 29/42 (2013.01); F16J 15/182 (2013.01)

(58) Field of Classification Search
CPC ...... F04D 29/129; F04D 29/10; F04D 29/086; F04D 29/106; F04D 29/108; F04D 29/08; F04D 29/12; F04D 29/128; F04D 25/16; F04D 13/12; F04D 29/42; F04D 29/06; F16J 15/38; F16J 15/54; F16J 15/06; F16J 15/04; F16J 15/26; F16J 15/18; F16J 15/182; F16J 15/184; F16J 15/186; F16J 15/28; F16J 15/30; F16J 15/3276; F16J 15/328; F16J 15/3436; F16J 15/3452; F16J 15/50

See application file for complete search history.

(56) References Cited

U.S. PATENT DOCUMENTS

| 2,185,986 | A | * | 1/1940 | McCoy | .................. | F16D 25/042 |
| | | | | | | 192/85.12 |
| 2,486,939 | A | * | 11/1949 | Freund | .................... | F16J 15/002 |
| | | | | | | 277/512 |
| 2,824,759 | A | * | 2/1958 | Tracy | .................... | F04D 29/128 |
| | | | | | | 277/361 |
| 3,154,020 | A | * | 10/1964 | Sieghartner | ............. | F04D 5/003 |
| | | | | | | 277/422 |
| 3,291,056 | A | * | 12/1966 | Steinman | ............. | F04D 13/0646 |
| | | | | | | 310/214 |
| 3,339,930 | A | * | 9/1967 | Tracy | ..................... | F16J 15/346 |
| | | | | | | 277/361 |
| 3,530,819 | A | * | 9/1970 | Modrey | .................. | B63H 23/34 |
| | | | | | | 114/144 R |

(Continued)

*Primary Examiner* — Jason D Shanske
*Assistant Examiner* — Joshua R Beebe
(74) *Attorney, Agent, or Firm* — Howard L. Speight, PLLC

(57) ABSTRACT

The disclosed invention modifies existing centrifugal pump design by replacing a compression seal with a mechanical seal and lubricant reservoir. The mechanical seal creates a sealed chamber to lubricate the rotating shaft. The rotating shaft is covered in a shaft sleeve that facilitates the flow of lubricant to and from the sealed chamber. This improvement provides independent lubrication to the centrifugal pump to protect against seal failure.

3 Claims, 5 Drawing Sheets

(56) References Cited

U.S. PATENT DOCUMENTS

| | | | | |
|---|---|---|---|---|
| 3,697,088 A * | 10/1972 | Hummer | ............... | F16J 15/38 |
| | | | | 277/348 |
| 4,047,858 A * | 9/1977 | Zalis | ............... | F04C 15/0038 |
| | | | | 277/505 |
| 6,210,103 B1 * | 4/2001 | Ramsay | ............... | F16C 25/02 |
| | | | | 277/318 |
| 2008/0122182 A1 * | 5/2008 | Parker | ............... | F04C 2/1073 |
| | | | | 277/329 |
| 2010/0253007 A1 * | 10/2010 | Tackett | ............... | F04B 15/04 |
| | | | | 277/513 |

* cited by examiner

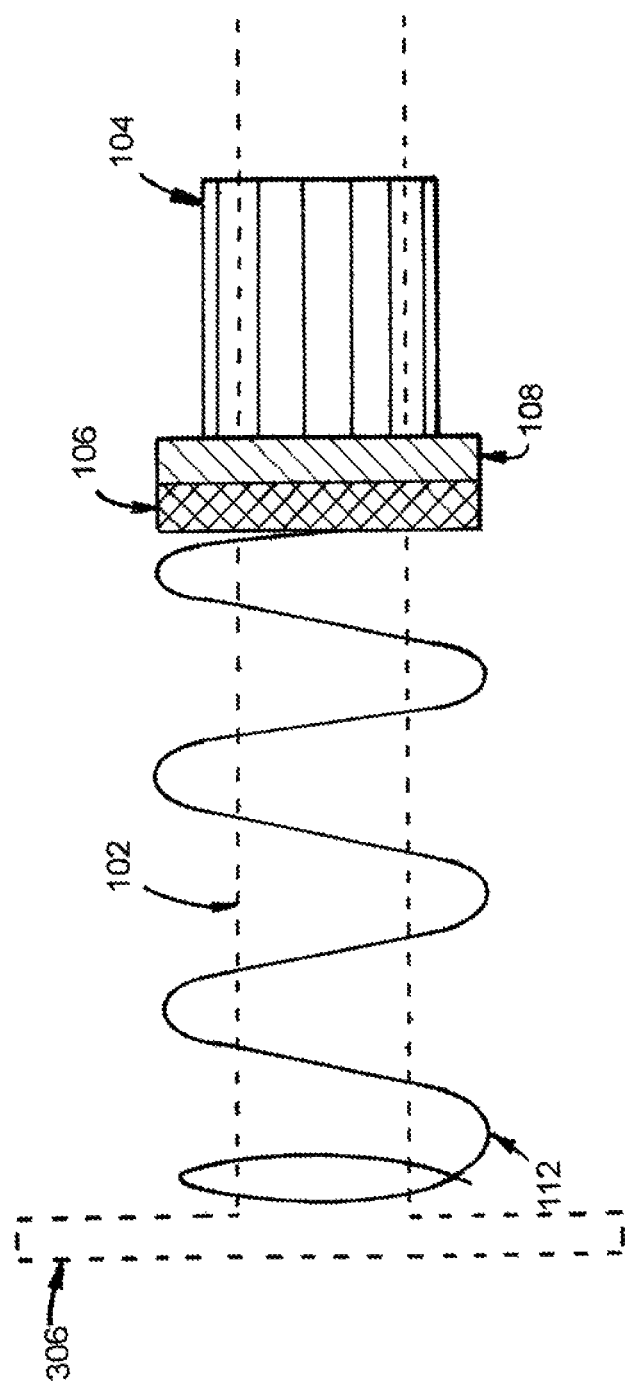

PUMP SEAL LUBRICATOR

BACKGROUND

The present disclosure involves a centrifugal pump 100. The mechanism of a centrifugal pump 100 is well known to those skilled in the art. The centrifugal pump 100 is connected to a source of fluid to be transported. A rotating shaft 102 rotates an impeller 306 creating a negative pressure to pull the fluid into the centrifugal pump 100 to be discharged.

The outer portion of the centrifugal pump 100 is formed by centrifugal pump housing 302 coupled to a stuffing box 202 that seals the rear of the centrifugal pump 100. The stuffing box 202 contains a stuffing box throat 204 with a stuffing box throat aperture 210 that allows the rotating shaft 102 to be inserted into the stuffing box 202 to connect with the impeller 306. Due to the pressure of fluid within the centrifugal pump 100, there is a potential for leakage from the stuffing box 202 where the rotating shaft 102 enters the stuffing box throat aperture 210. The space between the rotating shaft 102 and the stuffing box throat aperture 210 is filled with a seal that typically encircles the rotating shaft 102 near the distal end of the stuffing box throat 204.

Seals used in a centrifugal pump 100 may take many forms. One example is compression packing, also known as rope packing. Compression packing encircles the rotating shaft 102 is such a manner that when the stuffing box 202 is installed on the centrifugal pump 100, the compression packing is within the stuffing box throat 204. A gland coupled to the stuffing box 202 exerts pressure into the stuffing box 202 and the compression packing to keep the compression packing in position. The displacement of the compression packing by the gland acts as a seal.

In order for the compression packing to maintain integrity and act as a seal, it needs to remain lubricated. In oil field embodiments, the centrifugal pump 100 uses the fluid being transported as a lubricant for seals. If for some reason the centrifugal pump 100 runs during an interruption in the fluid flow, then the centrifugal pump 100 will operate without the benefit of lubrication. This will increase friction on the rotating shaft 102, which will cause an increase in temperature that will ruin the seals. A ruined seal will force the operators to repair the pump or replace the centrifugal pump 100 and send the damaged centrifugal pump 100 for service. Additionally, even with proper lubrication, seals in a centrifugal pump 100 leak lubricant.

Pump seals can fail for other reasons. Besides the interruption of fluid during operations, a centrifugal pump 100 may be started with insufficient prime. If there is no prime, then the fluid will not reach the seals to lubricate them. Once the centrifugal pump 100 starts operations, the movement of the rotating shaft 102 without adequate lubrication will cause friction, leading to heat buildup, compromising the seals. These and other previously unrecognized problems in the background of the invention lead to further development of the invention.

FIELD OF THE INVENTION

The present invention relates preventing fluid from leaking from a centrifugal pump 100 by increasing the lubrication reliability of the seals of the centrifugal pump 100.

SUMMARY

The disclosed invention modifies an existing centrifugal pump 100 system to improve the seals of the centrifugal pump 100 by changing the seals themselves and providing said seals with an independent lubrication. Multiple references will be made to proximal end and distal end. Proximal will indicate towards the connection of the rotating shaft 102 and impeller 306, while distal will indicate away from the connection of the rotating shaft 102 and impeller 306.

The disclosed invention creates a sealed chamber 304 within the stuffing box throat 204. The stuffing box throat aperture 210 is constricted by an oil and grease seal 214 dimensioned to be inserted in the stuffing box throat aperture 210 and allow the exit of a shaft sleeve 104. Within the stuffing box throat 204 is a stuffing box throat constriction 118 that narrows the stuffing box throat 204. A stationary shaft seal 108 is installed towards the proximal end of the stuffing box throat constriction 118.

Next, a shaft sleeve 104 is inserted into the stuffing box throat 204. The shaft sleeve 104 is dimensioned to pass though and be in contact with the inner surface of the oil and grease seal 214 as well as the stationary shaft seal 108, but allow rotation of the shaft sleeve 104. Coupled to the proximal end of the shaft sleeve 104 is a rotating shaft seal 106 made from a dry lubricant material. The shaft sleeve 104 is installed into the stuffing box throat 204 such that the shaft sleeve 104 passes through the stationary shaft seal 108 until the rotating shaft seal 106 makes contact with the stationary shaft seal 108. When the centrifugal pump 100 is reassembled, a coil spring 112 is installed that encircles the rotating shaft 102. When the stuffing box 202 is recoupled to the centrifugal pump 100, the rotating shaft 102 will pass through the shaft sleeve 104, in a manner that the shaft sleeve 104 will rotate as the rotating shaft 102 rotates. The coil spring will act on the rotating shaft seal 106, which in turn applies pressure to the stationary shaft seal 108. The pressure of the rotating shaft seal 106 pressing against the stationary shaft seal 108 creates a mechanical seal. The mechanical seal and the oil and grease seal 214 create the sealed chamber 304 that lubricant can be held in.

A pair of openings are made in the stuffing box throat 204 at a substantially 45 degrees off from the horizontal axis. These openings allow at least one input tube 410 and at least one output tube 406 to be connected from the stuffing box 202 to a lubricant reservoir 402 located above the stuffing box 202. These openings allow the lubricant to enter the sealed chamber 304 through the stuffing box lubricant inlet 308. When the shaft sleeve 104 rotates, it acts as a gear pump, propelling a portion of the lubricant though the stuffing box lubricant outlet 310 with sufficient force to reenter the lubricant reservoir 402.

The shaft sleeve 104 may in an additional exemplary embodiment have a series of shaft sleeve indentations 116 that will assist in circulating the lubricant as the centrifugal pump 100 operates. The shaft sleeve indentations 116 alter the effectiveness of the gear pump created by the shaft sleeve 104.

BRIEF DESCRIPTION OF FIGURES

For a more complete understanding of the present inventions and the advantages thereof, reference is now made to the following description taken in conjunction with the accompanying drawings in which like reference numbers indicate features and wherein:

FIG. 1 illustrates a combination of a coil spring 112, a shaft sleeve 104, a stationary shaft seal 108, and a rotating shaft seal 106 over the rotating shaft 102 coupled to an impeller 306 in an exemplary embodiment, where the rotating shaft 102 and impeller 306 are shown in dotted outline.

DETAILED DESCRIPTION OF THE INVENTION

Figure 2A:
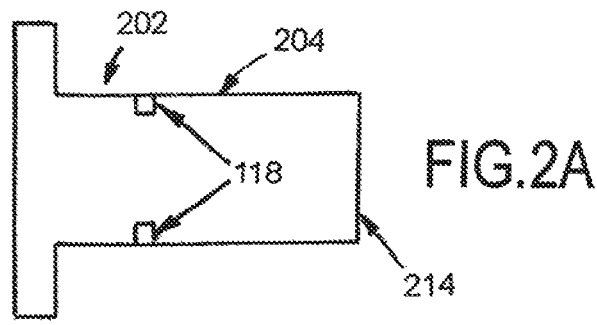
FIGS. 2A-2D illustrate the installation of the stationary shaft seal 108 and the combined shaft sleeve 104 with rotating shaft seal 106 into a stuffing box 202 in an exemplary embodiment.
Figure 2B:
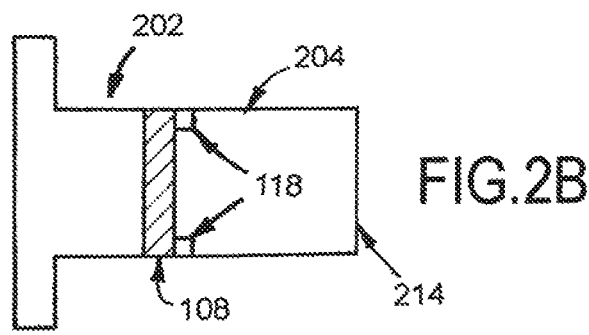
Figure 2C:
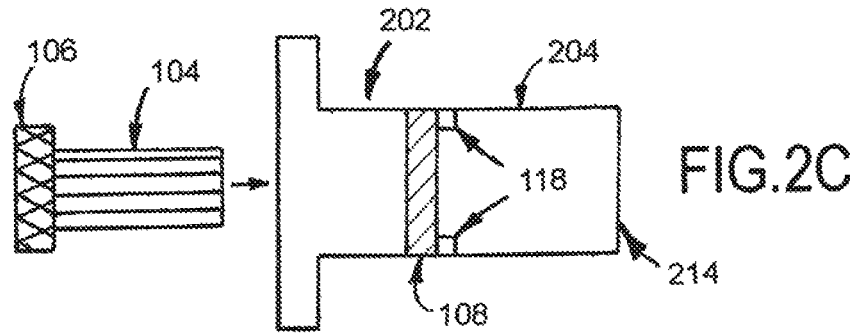
Figure 2D:
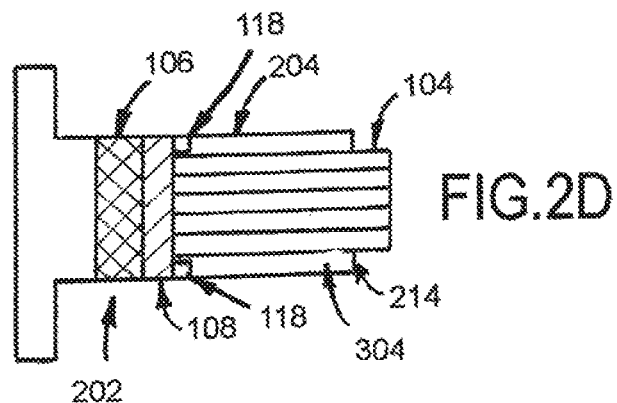

The disclosed invention involves a stationary shaft seal 108, a rotating shaft seal 106, a shaft sleeve 104, a coil spring 112, an output tube 406, an input tube 410, and lubricant reservoir 402. These items are used to create a mechanical seal within a centrifugal pump 100 that allows a lubricant reservoir 402 to preserve the seals of a centrifugal pump 100 independently of the fluid being transported by the centrifugal pump 100.

The disclosed items may be used to modify a preexisting centrifugal pump 100. In an exemplary embodiment, the gland and the original stuffing box are removed to allow access to the interior of the centrifugal pump 100. Removing the original stuffing box exposes the impeller 306 and the rotating shaft 102. The packing surrounding the rotating shaft 102 is then removed in preparation for the installation of the invention in an exemplary embodiment.

The disclosed invention uses a stuffing box 202 that differs from the original stuffing box. Within the stuffing box throat 204 in the exemplary embodiment is at least one stuffing box throat constriction 118. This stuffing box throat constriction 118 is a narrowing of the stuffing box throat 204 toward at the proximal end of the stuffing box throat 204 where a stationary shaft seal 108 may be coupled.

Figure 5A:
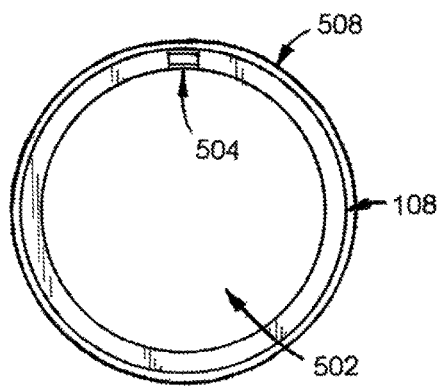
FIGS. 5A-5B illustrate the stationary shaft seal 108 in an exemplary embodiment.
Figure 5B:
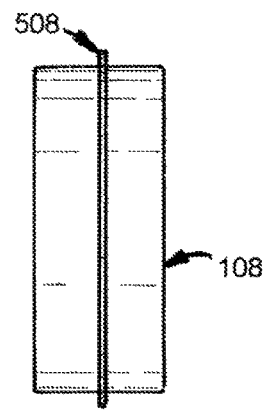
Figure 5C:
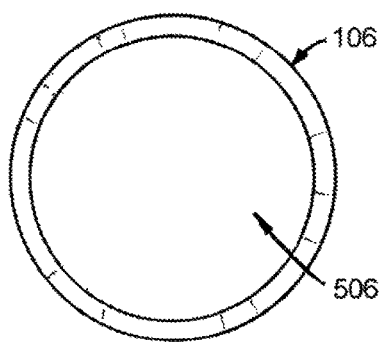
FIGS. 5C-5D illustrate the rotating shaft seal 106 in an exemplary embodiment.
Figure 5D:
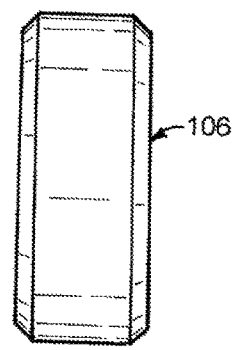
Figure 5E:
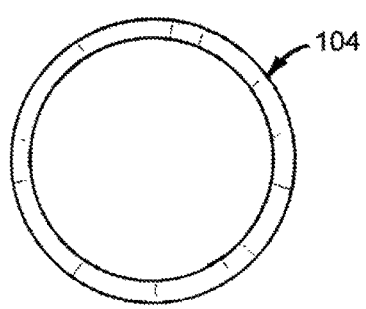
FIGS. 5E-5F illustrate the rotating shaft sleeve 104 in an exemplary embodiment.
Figure 5F:
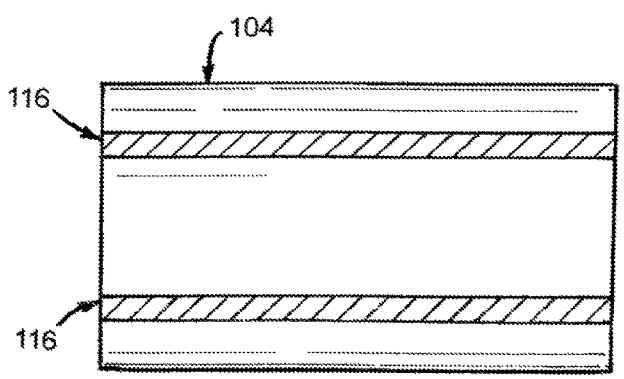

In the exemplary embodiment, the stationary shaft seal 108 is shown in FIGS. 5A-5B, with the rotating shaft seal 106 shown in FIGS. 5C-5D and the shaft sleeve 104 shown in FIG. 5E-5F. The process of modifying the seals in the exemplary embodiment is shown through FIGS. 2A-2D.

In an exemplary embodiment, the fixed components are installed first. The stationary shaft seal 108 is installed by placing it against the proximal end of the stuffing box throat constrictions 118. The stationary shaft seal 108 is kept immobile by any means known to those skilled in the art. The stationary shaft seal 108 in the exemplary embodiment is held in position by stationary shaft seal indentation 504 that corresponds to an indentation in the stuffing box throat constriction 118. The interaction of the stationary shaft seal indentation 504 may couple to the indention in the stuffing box throat constriction 118 in any manner known to those skilled in the art. For example, the stationary shaft seal indentation 504 and the indentation in the stuffing box throat constriction 118 may accept a fastener to keep them fixed relative to each other. The stationary shaft seal 108 includes a silicone seal 508 and a stationary shaft seal aperture 502. The stuffing box 202 has an oil and grease seal 214 installed at the distal end of the stuffing box throat 204.

In addition to the fixed parts, there are rotating parts to be installed. A rotating shaft seal 106 in an exemplary embodiment includes a rotating shaft seal aperture 506. In the exemplary embodiment, the rotating shaft seal 106 is made of tungsten carbide or silicon carbide. The rotating shaft seal 106 is used to apply pressure to the stationary shaft seal 108 when the centrifugal pump 100 is reassembled. The rotating shaft seal 106 is placed on the proximal end of the shaft sleeve 104. The dimensions of the shaft sleeve 104 are such that the shaft sleeve 104 can pass through the stationary shaft seal 108 and the oil and grease seal 214. The shaft sleeve 104 with rotating shaft seal 106 is installed in the stuffing box throat 204 in a manner where the distal end of the shaft sleeve 104 proceeds past the stationary shaft seal 108, resulting in the face of the stationary shaft seal 108 and the face of rotating shaft seal 106 coming into contact. A substantial portion of the shaft sleeve 104 proceeds past the stationary shaft seal 108.

Figure 3:
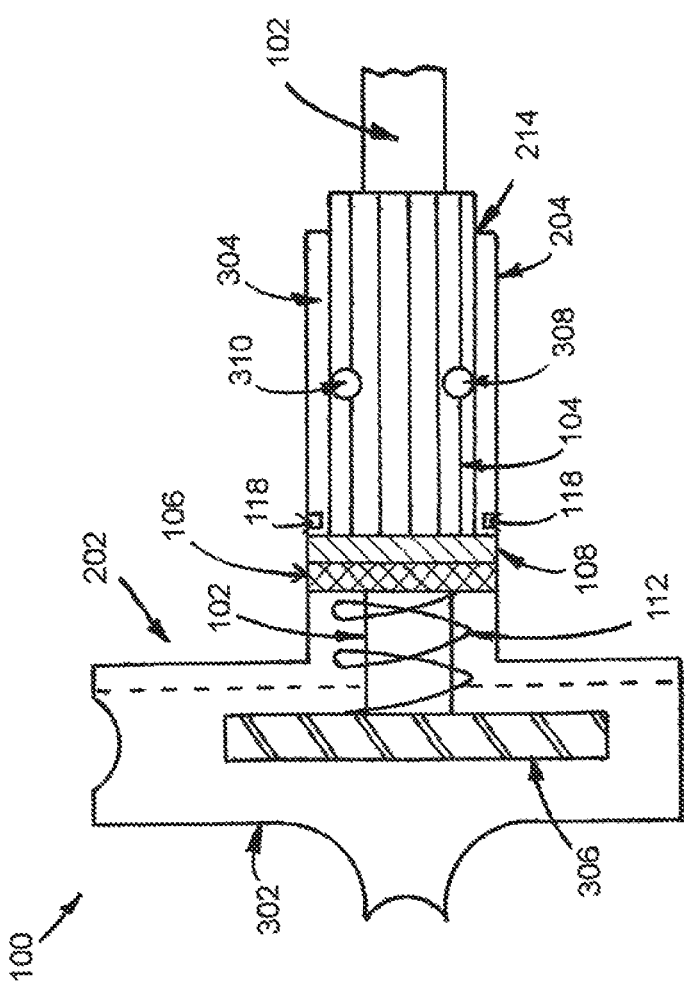
FIG. 3 illustrates the integration of the invention within the centrifugal pump 100 in an exemplary embodiment.

In an exemplary embodiment, a coil spring 112 is used to apply pressure to the rotating shaft seal 106. To install the coil spring 112, the impeller 306 is decoupled from the rotating shaft 102 and the coil spring 112 then is installed over the rotating shaft 102. The impeller 306 is then recoupled to the rotating shaft 102. When the seals are properly installed as described above, the stuffing box 202 is recoupled to the centrifugal pump housing 302 as shown in FIG. 3. The gland is no longer needed as it becomes a vestigial component in the exemplary embodiment.

Once the stuffing box 202 is recoupled to the centrifugal pump housing 302, the rotating shaft 102 now passes through the shaft sleeve 104. The coil spring 112 pushes against the impeller 306, applying force to the rotating shaft seal 106, which in turn applies pressure on the stationary shaft seal 108. The application of pressure on the stationary shaft seal 108 creates a mechanical seal in the proximal end of the stuffing box throat 204. FIG. 1 illustrates the coil spring 112 with the rotating shaft seal 106, stationary shaft seal 108, and shaft sleeve 104 over an outline of the location of the rotating shaft 102 and the impeller 306. The oil and grease seal 214 form the barrier on the distal end of the stuffing box throat 204. In the exemplary embodiment, the shaft sleeve 104 protrudes past the oil and grease seal 214. The mechanical seal and the oil and grease seal 214 form a sealed chamber 304 in the stuffing box 202. In this sealed chamber 304 the lubricant can be held to lubricate the stationary shaft seal 108 and the oil and grease seal 214.

Figure 4:
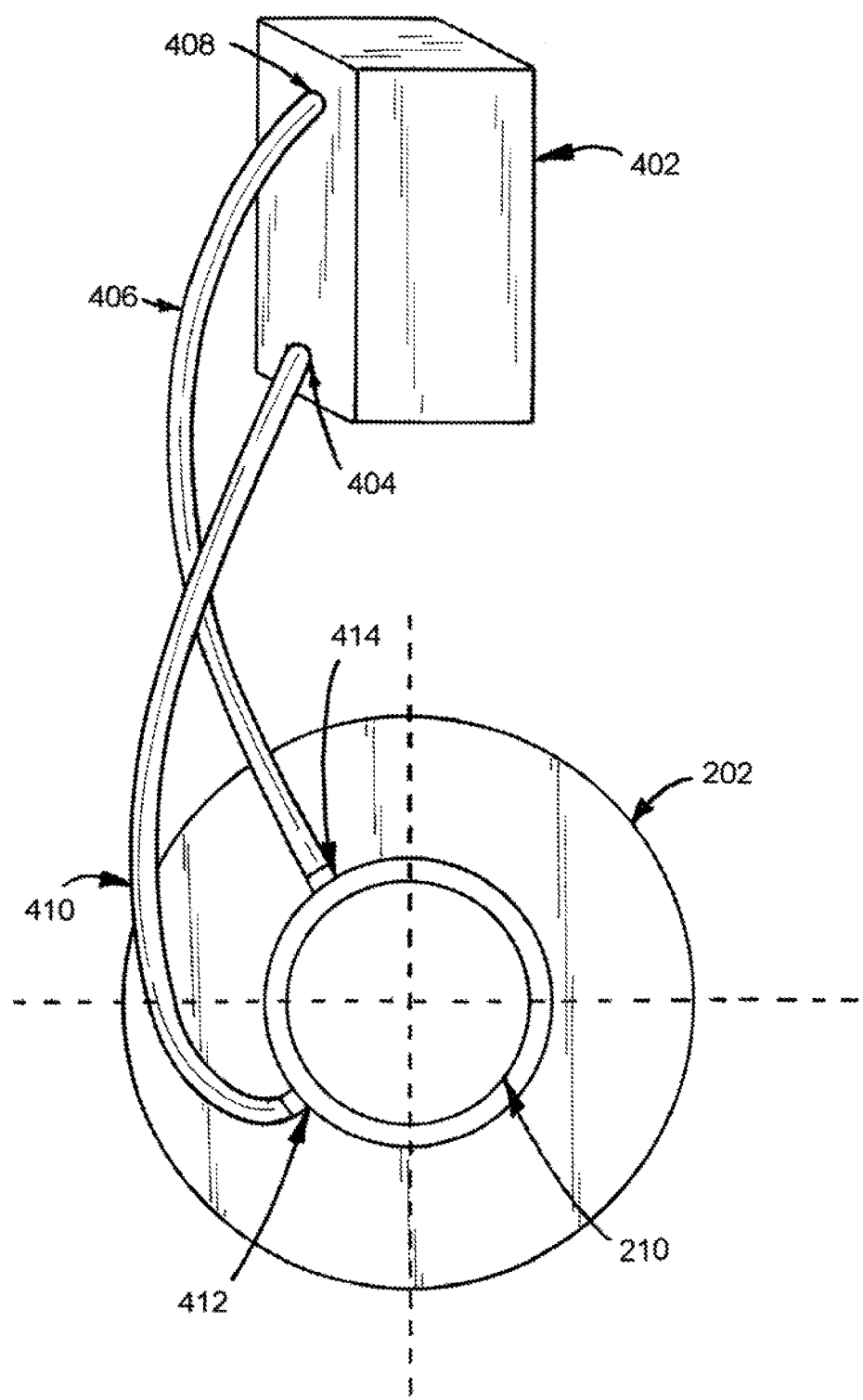
FIG. 4 illustrates the connection between a lubricant reservoir 402 and a stuffing box 202 in an exemplary embodiment.

Next a lubricant reservoir 402 is installed. As seen in FIG. 4, the lubricant reservoir 402 has a lubricant reservoir inlet 408 and lubricant reservoir outlet 404 to allow an input tube 410 and an output tube 406 to connect the lubricant reservoir 402 to the stuffing box 202. The lubricant reservoir 402 may be mounted in any configuration known to those skilled in the art in a manner that allows the lubricant to naturally drain out the lubricant reservoir outlet 404. This draining may occur from gravity or by a difference in pressure created by the rotation of the shaft sleeve 104.

The lubricant reservoir 402 may be placed in position in any manner know to those skilled in the art. One method may involve decoupling at least one of the fasteners that connect the stuffing box 202 to the centrifugal pump housing 302. The lubricant reservoir 402 may be mounted on a projection that can be secured by placing the projection in the location of the fasteners such that when the fasteners are secured the centrifugal pump housing 302, stuffing box 202, and lubricant reservoir 402 are coupled together in a rigid configuration.

In a further exemplary embodiment, the lubricant reservoir 402 may be mounted by replacing the stuffing box 202 all together by creating a modified stuffing box that already has the lubricant reservoir 402 mounted in any manner know to those skilled in the art.

In an exemplary embodiment, the stuffing box 202 used is different from the original stuffing box that was decoupled from the centrifugal pump 100. The stuffing box 202 used in an exemplary embodiment contains a stuffing box lubricant outlet 310 with an output coupler 414 located at substantially 45 degrees above the horizontal axis and a stuffing box lubricant inlet 308 with an input coupler 412 at substantially 45 degrees below the horizontal axis.

In an alternative embodiment, the original stuffing box of the centrifugal pump 100 may be used as opposed to a stuffing box 202 specifically designed for use in the disclosed embodiment. The original stuffing box throat may be modified to include the stuffing box lubricant inlet 308 and stuffing box lubricant outlet 310 installed by any means know to those skilled in the art. The resulting modified original stuffing box acts substantially as the stuffing box 202 in the previous embodiments.

In the operations of an exemplary embodiment, as the rotating shaft 102 rotates, the shaft sleeve 104 rotates as well, acting as a gear pump on the lubricant. As the lubricant fills the sealed chamber 304 through the stuffing box lubricant inlet 308, lubricant comes into contact with the shaft sleeve 104. The lubricant settles in the sealed chamber 304, immersing the shaft sleeve 104 in lubricant. This provides a source of lubrication for the seals of the centrifugal pump 100 regardless of whether any fluid is being pumped through the centrifugal pump 100. The rotation of the shaft sleeve 104 will force lubricant to be discharged through the stuffing box lubricant outlet 310 with sufficient force to reenter the lubricant reservoir 402 through the lubricant reservoir inlet 408. The location of the openings of the stuffing box lubricant inlet 308 and stuffing box lubricant outlet 310 as disclosed above provide the optimum location to maximize the flow of lubricant to the lubricant reservoir 402.

In an additional exemplary embodiment, the shaft sleeve 104 further comprises shaft sleeve indentations 116. These shaft sleeve indentations 116 assist the transfer of the lubricant into the lubricant reservoir 402. In the exemplary embodiment, the shaft sleeve indentations 116 are characterized as being parallel to the long axis of the shaft sleeve 104. The shaft sleeve 104 with shaft sleeve indentations 116 acts as a gear pump to move the lubricant by propelling the lubricant back into the lubricant reservoir 402 as previously discussed. The different shaft sleeve indentions 116 can alter the flow rate of the lubricant. Multiple shaft sleeve indentation 116 styles are possible. There may be indentations in any orientation without departing from the scope of the invention.

In a further exemplary embodiment, the centrifugal pump 100 may be manufactured with the modifications previously discussed, with the stuffing box throat 204 comprising a stationary shaft seal 108 and an oil and grease seal 214 already installed. A rotating shaft seal 106 and a shaft sleeve 104 circumscribe the rotating shaft 102 as shown in previously disclosed embodiments. A coil spring 112 pushes against the impeller 306, thereby pushing against the rotating shaft seal 106. The force of the rotating shaft seal 106 against the stationary shaft seal 108 forms a mechanical seal on the proximal end of the stuffing box throat 204, while an oil and grease seal 214 forms the seal at the distal end of the stuffing box throat 204. The sealed chamber 304 between the mechanical seal and the oil and grease seal 214 receives lubricant from a lubricant reservoir 402. The lubricant is received from a stuffing box lubricant inlet 308 at approximately 45 degrees below the horizontal axis of the centrifugal pump 100. The lubricant leaves the sealed chamber 304 from a stuffing box lubricant outlet 310 at approximately 45 degrees above the horizontal axis of the centrifugal pump 100. The rotation of the rotating shaft 102 sleeve acts as a gear pump, propelling lubricant back into the lubricant reservoir 402.

In an additional exemplary embodiment, the components for the previously discussed embodiments may be presented as a kit to alter an existing centrifugal pump 100 into one reflected in this disclosure.

One of skill in the art will appreciate that embodiments provide improved seals for multiple pumping applications. Although specific embodiments are illustrated and described herein, it will be appreciated by those of ordinary skill in the art that any arrangement which is calculated to achieve the same purpose can be substituted for the specific embodiments shown. This specification is intended to cover any adaptations or variations of embodiments. For example, although described in terms of the specific embodiments, one of ordinary skill in the art will appreciate that implementations can be made in different embodiments to provide the required function. In particular, one of skill in the art will appreciate that the names and terminology are not intended to limit embodiments. Furthermore, additional apparatus can be added to the components, functions can be rearranged among components, and new components corresponding to future enhancements and future physical devices used in embodiments can be introduced without departing from the scope of embodiments. The terminology used in this application is intended to include all environments and alternatives which provide the same functionality as described herein.

The invention claimed is:
1. A centrifugal pump comprising:
a centrifugal pump housing;
a stuffing box coupled to said centrifugal pump housing, further comprising:
    a stuffing box throat extending away from said centrifugal pump housing;
    wherein said stuffing box throat further comprises:
        a stuffing box throat constriction;
        a stuffing box throat aperture;
        a stuffing box throat proximal end; and
        a stuffing box throat distal end;
an impeller located within said centrifugal pump housing;
a rotating shaft coupled to said impeller, wherein said rotating shaft extends out of said stuffing box through said stuffing box throat aperture in a manner that the rotation of said rotating shaft will cause said impeller to rotate within said centrifugal pump housing;
a mechanical seal comprising:
    a stationary shaft seal coupled to the interior of said stuffing box throat and installed against said stuffing box throat constriction;
    a rotating shaft seal circumscribing said shaft sleeve and in contact with the proximal surface of said stationary shaft seal;
an oil and grease seal circumscribing said stuffing box throat distal end, wherein said oil and grease seal and said mechanical seal form a sealed chamber;
a shaft sleeve circumscribing a first section of said rotating shaft within said stuffing box, wherein said shaft sleeve is dimensioned to pass through said stationary shaft seal, said rotating shaft seal, and said oil and grease seal in a manner to minimize leakage;

a spring circumscribing a second section of said rotating shaft, in communication with said rotating shaft seal and said impeller, and exerting force opposite said impeller, wherein said rotating shaft seal is pressed against said stationary shaft seal; and a lubricant reservoir containing lubricant in communication with said shaft sleeve;

wherein said lubricant reservoir outputs said lubricant into said sealed chamber from a stuffing box lubricant inlet at substantially 45 degrees below the horizontal axis of said rotating shaft; and wherein said lubricant reservoir receives said lubricant from said sealed chamber from a stuffing box lubricant outlet at substantially 45 degrees above the horizontal axis of said rotating shaft.

2. The centrifugal pump of claim 1, wherein said shaft sleeve further comprises a least one indentation.

3. The centrifugal pump of claim 1, wherein said lubricant reservoir receives said lubricant by the force of said shaft sleeve rotation causing said lubricant to enter said stuffing box lubricant outlet to return to said lubricant reservoir.

* * * * *